United States Patent
Ramprasad (10) Patent No.: US 9,571,665 B2
(45) Date of Patent: Feb. 14, 2017

(54) SYSTEM AND METHOD FOR MODIFYING SETTINGS ON ELECTRONIC DEVICES

(71) Applicant: TracFone Wireless, Inc., Miami, FL (US)

(72) Inventor: Satish Ramprasad, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 14/819,938

(22) Filed: Aug. 6, 2015

(65) Prior Publication Data
US 2016/0044180 A1    Feb. 11, 2016

Related U.S. Application Data

(60) Provisional application No. 62/033,940, filed on Aug. 6, 2014.

(51) Int. Cl.
*H04M 15/00*    (2006.01)
*H04W 4/00*    (2009.01)

(52) U.S. Cl.
CPC ......... *H04M 15/723* (2013.01); *H04M 15/61* (2013.01); *H04M 15/73* (2013.01); *H04W 4/001* (2013.01)

(58) Field of Classification Search
CPC ......... H04W 4/12; H04W 12/08; H04L 51/12; H04L 63/08
USPC ............ 455/414.1–414.3, 432.1, 435.1
See application file for complete search history.

(56) References Cited

U.S. PATENT DOCUMENTS

2014/0229363 A1*  8/2014  Orloff ............... G06Q 40/025
                                                      705/38

* cited by examiner

*Primary Examiner* — Sam Bhattacharya
(74) *Attorney, Agent, or Firm* — Baker & Hostetler LLP (57) ABSTRACT

The application is directed to a method for improving a user's experience on an electronic device. An application for modifying data service is displayed on a display of an electronic device. A request is received by the application from a user to modify a current data service with a new data service. The application evaluates the requested, new data service in view of predetermined information based upon the user. The application updates the electronic device with the new data service after its evaluation.

20 Claims, 6 Drawing Sheets

SYSTEM AND METHOD FOR MODIFYING SETTINGS ON ELECTRONIC DEVICES

CROSS REFERENCE TO PRIOR APPLICATIONS

This application claims the benefit from U.S. Provisional Application No. 62/033,940 filed on Aug. 6, 2014, which is hereby incorporated by reference for all purposes as if fully set forth herein.

BACKGROUND OF THE DISCLOSURE

1. Field of the Disclosure

This application generally relates to methods, systems, and software applications for improving user experience on an electronic device as it relates to data services. More particularly, this application relates to methods, systems, and software applications for modifying wireless data services on electronic devices.

2. Related Art

Electronic devices, such as, for example, a wireless cell phone, typically allow users to activate their electronic devices to have wireless service based on a monthly plan. Once the monthly plan is provisioned, an end user is able to talk, text, web browse, email, access data services, and the like at a selected data service rate. Similarly, Pre-paid electronic devices, such as, for example, a pre-paid wireless cell phone, typically allow users to activate their electronic devices and add wireless service. Once the wireless service is provisioned, an end user is able to talk, text, web browse, email, access data services, and the like at the selected data service rate until the wireless service has been depleted.

A user seeking to use a data service must generally comport to the fixed and rigid data service rate structures included with the originally purchased service. Different rates are typically not available for purchase when choosing a service initially (data services ranging from low to high quality data service rates). For example, a user of an electronic device watching football games or online movies, may want to select a higher quality data service rate, while the user checking and responding to e-mail over the Internet, may preferably select a lower quality data service rate. Upon initiating service on an electronic device, a user will not have the ability to easily adjust the type of data service or rates currently in use. This is considered a drawback to many end users desiring quick and easy access to a cellular data network that can adjust data service based on their needs for usage of the electronic device.

A need exists in the art for systems, methods and software applications for upgrading and/or downgrading data service on an activated electronic device. A further need exists for a system and method for paying the cost per service as it is adjusted to meet the current needs of end users.

SUMMARY OF THE INVENTION

One aspect of the invention includes a process for modifying wireless data service in a wireless electronic device that includes displaying an application for modifying data services on a display of the electronic device, receiving a request from a user to modify a current data service with a new data service, evaluating the requested new data service request in view of predetermined information of the user, and updating the wireless data service with the new data service after the evaluation.

In another aspect of the invention a wireless electronic device is configured for modifying wireless data service and includes a display configured to display an application for modifying data services on a display of the electronic device, an input device configured to receive a request from a user to modify a current data service with a new data service, a processor configured to evaluate the requested new data service request in view of predetermined information of the user, and a transceiver configured to inform a wireless network regarding the wireless data service with the new data service after the evaluation.

In yet even another aspect of the invention a non-transitory computer readable storage medium storing computer-readable instructions for a software application for modifying data service, which when executed on a processor, causes an electronic device to execute instructions for displaying an application for modifying data services on a display of the electronic device, instructions for receiving a request from a user to modify a current data service with a new data service, instructions for evaluating the requested new data service request in view of predetermined information of the user, and instructions for updating the wireless data service with the new data service after the evaluation.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

As an initial matter, reference in this specification to "one aspect," "an aspect," "one or more aspects," or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not by other aspects.

User satisfaction is an important factor that wireless service providers consider in order to be competitive in the market. Customers, e.g., electronic device users, prefer outstanding services catering to their unique needs and lifestyle preferences. Some users prefer expensive data packages to ensure the best quality and speed for handling their daily tasks. Meanwhile, others can get by with fewer features than a standard data package. There are some users who prefer to change their data package in view of immediate needs only for a short duration. That is, high data quality data service rates when they need it and low data quality data service rates for the remainder of the time.

One aspect of the invention is to provide a system and method designed for upgrading and/or downgrading data service on an activated electronic device.

Another aspect of the invention is to provide a system and method allowing users to adjust the length of time a certain rate of data service on an electronic device is implemented.

A further aspect of the invention is to provide a system and method allowing users to pay for the cost of an adjusted rate of data service.

It is to be understood that the system modules and method steps described in this application may be employed in various forms of hardware, software, firmware, special purpose processors or a combination thereof. The application preferably is directed to a process and system utilizing a software application comprising executable code that is operably stored on one or more program storage devices including but not limited to a magnetic floppy disk, RAM, ROM, CD ROM, SIM, UICC, Flash memory or the like.

Reference in this specification to an electronic device 104 is intended to encompass devices such as mobile phones, tablet computers, gaming systems, MP3 players and the like. Reference to an "electronic device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "electronic device" may be interchangeably used and referred to herein as wireless handset, handset, mobile device, device, mobile phones, mobile equipment, mobile station, user equipment, cellular phone, smartphones, or phone.

An electronic device 104, such as, for example, a mobile phone, access networks via service providers. Some companies provide postpaid wireless services. These providers can be wireless carriers or Mobile Network Operators (MNO) that maintain and control their own wireless networks. An MNO relies heavily on backend systems to address any provisional, billing, security and data issues that might threaten the health of their networks.

A Mobile Virtual Network Operator (MVNO) is a mobile operator that typically does not own its own frequency spectrum and typically does not have its own network infrastructure. Instead, MVNOs have business arrangements and contracts with third party wireless carriers to purchase usage of their networks, minutes of use, volume of data transfer, number of SMS messages, etc. Such services may then be sold to end users, e.g., subscribers.

In aspects including a "wireless network", the network may encompass any type of wireless network including a Mobile Network Operator (MNO) or a Mobile Virtual Network Operator (MVNO) to provide mobile phone services through the use of an electronic device, such as the Global System for Mobile Communication (GSM) network, Code-Division Multiple Access (CDMA) network or the like, that may utilize the teachings of the present application to allow an electronic device 104 to connect to a wireless network 106.

Figure 1:
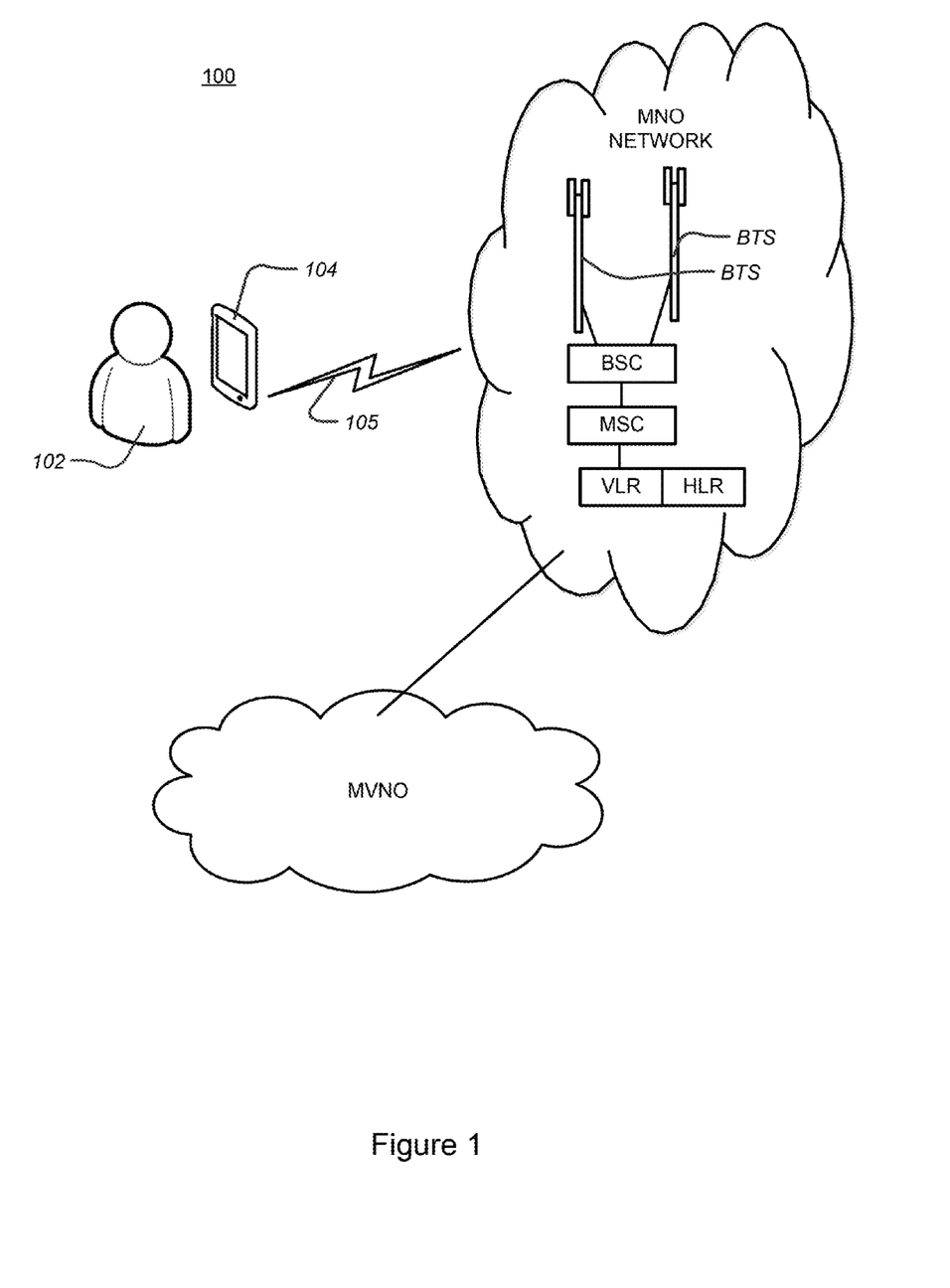
FIG. 1 illustrates a schematic diagram of an exemplary electronic device provisioning system in accordance with an aspect of the invention.

FIG. 1 illustrates an electronic device system 100, according to one or more aspects of the present disclosure. The electronic device system 100 may be used to activate, update, or end services on an electronic device 104. A user 102 enters the appropriate actions into the electronic device 104. For example, the user may enter an action to update data services on the electronic device 104. The actions may include, for example, powering on the already activated electronic device 104; selecting the data service application implemented on the electronic device 104 home screen 300 (shown in FIG. 3) or navigating to the data service application via a drop down menu; selecting the Change Service link in the data service application main screen 350 (shown in FIG. 3); and then following the change data service instructions displayed on the subsequent screen 400 (shown in FIG. 4) to complete the data service update. The electronic device 104 communicates over a channel 105 with a wireless network 106 for use in activating, updating, or ending services on the electronic device 104.

In an exemplary aspect, the channel 105 may be a data messaging channel. For example, the data messaging channel may include, but is not limited to, an Unstructured Supplementary Service Data (USSD) channel, a Short Message Service (SMS) messaging channel, a Wireless Application Protocol (WAP) messaging channel, a communication channel as defined herein, or the like.

In an exemplary aspect, the wireless network 106 receives the message from the electronic device 104 via the channel 105. The channel forwards the message in real-time to a content server (not shown) for the activation, update, or ending of services for the electronic device 104. In one or more aspects, the content server may be any server designed to send/receive, hold, and update information about the electronic device 104.

Figure 2:
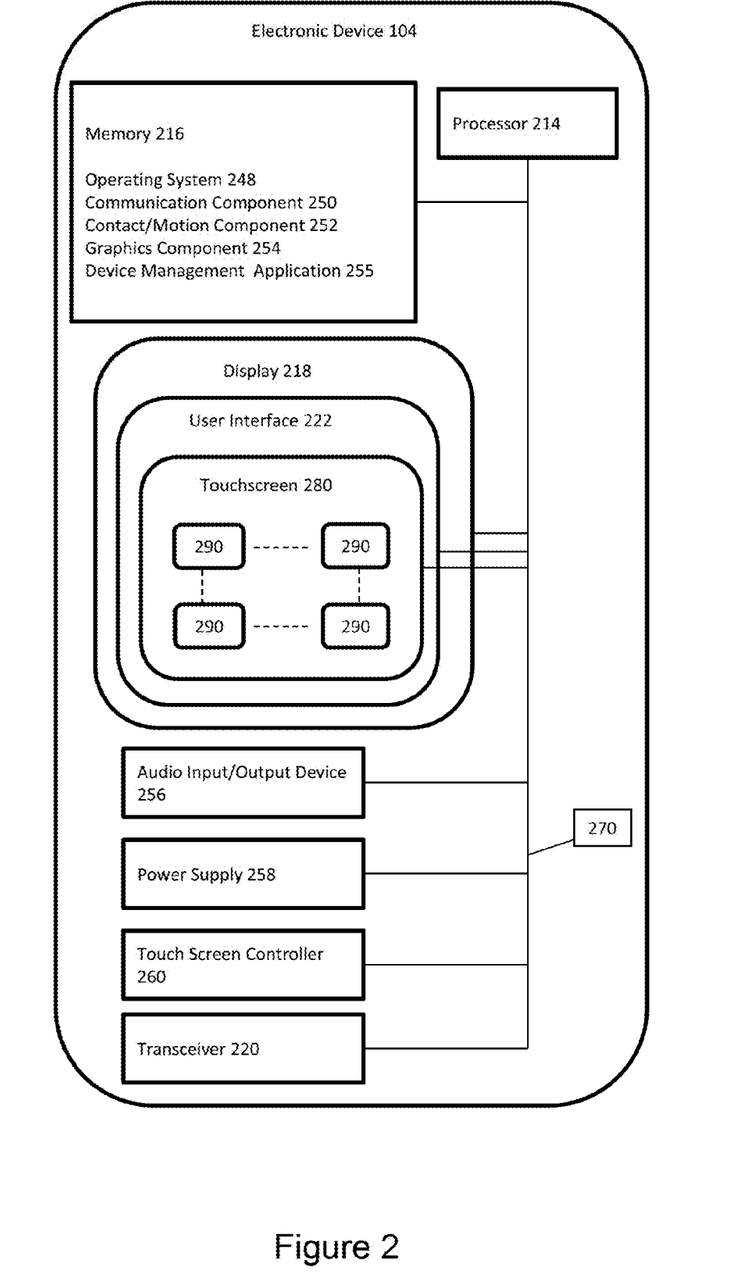
FIG. 2 illustrates an exemplary electronic device in accordance with an aspect of the invention.

FIG. 2 illustrates an exemplary electronic device 104, such as, for example, a mobile smart phone which may be employed in many aspects of this application. In an exemplary aspect, the electronic device 104 includes a processor 214, memory 216, display 218, a power supply 258 and a user interface 222.

The processor 214 may be a central processing unit configured to execute instructions, such as, for example, instructions related to software programs. Any processor can be used for the electronic device as understood to those of ordinary skill in the art. The display 218 may be a liquid crystal display (LCD). Preferably the LCD includes a backlight to illuminate the various color liquid crystals to provide a more colorful display. The user interface 222 may be any type of physical input as readily employed in the field. For example, the user interface may have physical buttons. Alternatively, the user interface may have implemented on a touchscreen 280 having a touchscreen controller 260.

The memory 216 of the electronic device 104 may further include an operating system 248, a communication component 250, a contact/motion component 252, a graphics component 254 and the like. The operating system 248 together with the various components provides software functionality for each of the components of the electronic device 104. The memory 216 may include a high-speed, random-access memory. Also, the memory 216 may be a non-volatile memory, such as magnetic fixed disk storage, flash memory, UICC, SIM card, or the like. These various components may be connected through various communication lines including a data bus 270.

Additionally, the electronic device 104 may include an audio input/output device 256. The audio input/output device 256 may include speakers, speaker outputs, and the like, providing sound output; and may include microphones, microphone inputs, and the like, for receiving sound inputs. The audio input/output device 256 may include an analog to digital converter and a digital to audio converter for audio input and output functions respectively.

When implemented as a wireless device, the electronic device 104 may include a transceiver 220. The electronic device 104 may provide radio and signal processing as needed to access a network for services. The processor 214 may be configured to process call functions, data transfer, and the like and provide other services to the user.

In an exemplary aspect, the touchscreen 280 of the invention may be implemented in the display 218 and may detect a presence and location of a touch of a user within the display area. For example, touching the display 218 of the electronic device 104 with a finger or hand. The Touchscreen 280 may also sense other passive objects, such as a stylus.

In operation, the display 218 may show various objects 290 associated with applications for execution by the processor 214. For example, a user may touch the display 218, particularly the touchscreen 280, to interact with the objects 290. That is, touching an object 290 may execute an application in the processor 214 associated with the object 290 that is stored in memory 216. Additionally or alternatively, touching an object 290 may open a menu of options to be selected by the user. The display 218 may include a plurality of objects 290 for the user to interact with. Moreover the display 218 may include a plurality of screens. The display 218 showing one screen at a time. The user may interact with the display 218 to move a screen into view on the display 218. Various objects 290 may be located in each of the screens.

The touchscreen 280 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 218 is generally configured to display a graphical user interface (GUI) that provides an easy to use visual interface between a user of the electronic device 104 and the operating system or application(s) running on the electronic device 104. Generally, the GUI presents programs, files and operational options with graphical images. During operation, the user may select and activate various graphical images displayed on the display 218 in order to initiate functions and tasks associated therewith.

In another aspect of the invention, the memory 216 of an electronic device 104 includes a database for storing user information. The user information is exemplary, and may include further information as required by the service provider and may include information such as full name, address, date of birth, email address, contact number, credit card information, and the like. In one aspect, the database may include security questions. In another aspect, the database may include user specified preferences.

In another aspect of the application, the memory 216 of an electronic device 104 includes a device management software application 255. This application 255 allows the user to manage settings and functions of various applications on their electronic device 104.

In a further exemplary aspect, predetermined information regarding the user may be stored and available for the application to review and use to determine whether to change the user's current service. For example, predetermined information of the user may include, but is not limited to, available remaining minutes, tracking information on user minutes used for different time periods, current data rate quality, available remaining data for users at different data rate qualities (fixed or variable), time stamps for any future/already purchased data service modifications, credit/debit card and PayPal information, security profile, user-approved billing requests, security questions, and combinations thereof.

Preferably, the electronic device 104 is a hand-held device. The hand-held device may include but is not limited to laptop devices, tablets, PDAs and smartphones. More preferably, the hand-held device is a smartphone. Even more preferably, the smartphone is a device utilizing pre-paid wireless network services obtained from a MVNO.

Figure 3:
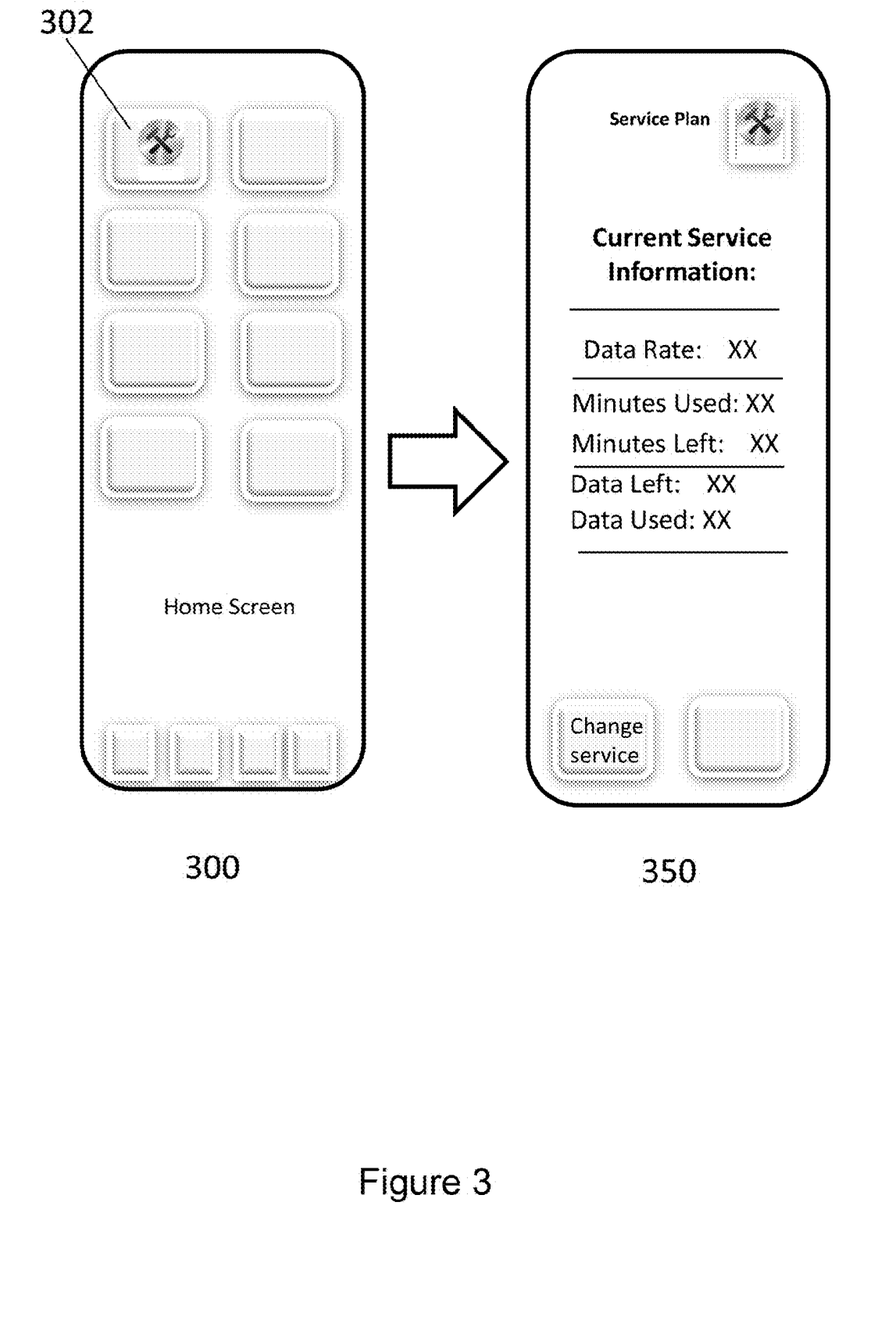
FIG. 3 illustrates exemplary electronic device displays providing data service options for the electronic device in accordance with an aspect of the invention.

According to yet another exemplary aspect as illustrated in FIG. 3, the electronic device 104 includes a home screen 300 including one or more applications. The home screen may include but is not limited to a calling icon, texting icon, and Internet icon and the like allowing a user to perform one or more functions on the electronic device 104. The home screen may also display icons for one or more applications that have been downloaded from the Internet, or retrieved from a store, such as the Play or Apple store. In particular, one of the applications (displayed via an icon 302), upon being launched, allows users to modify their wireless services on an activated electronic device 104.

A launched application is shown on a secondary screen 350 in FIG. 3. The user interface screen 350 displays service information of the application. The application, for example, allows a user to view their current service information. The current service information may include but is not limited to their data rate, data and minute usage, and remaining data and minutes left in association with the wireless service. The functionalities available to the user via the graphical user interface on screen 350 will be discussed below in more detail.

Figure 4:
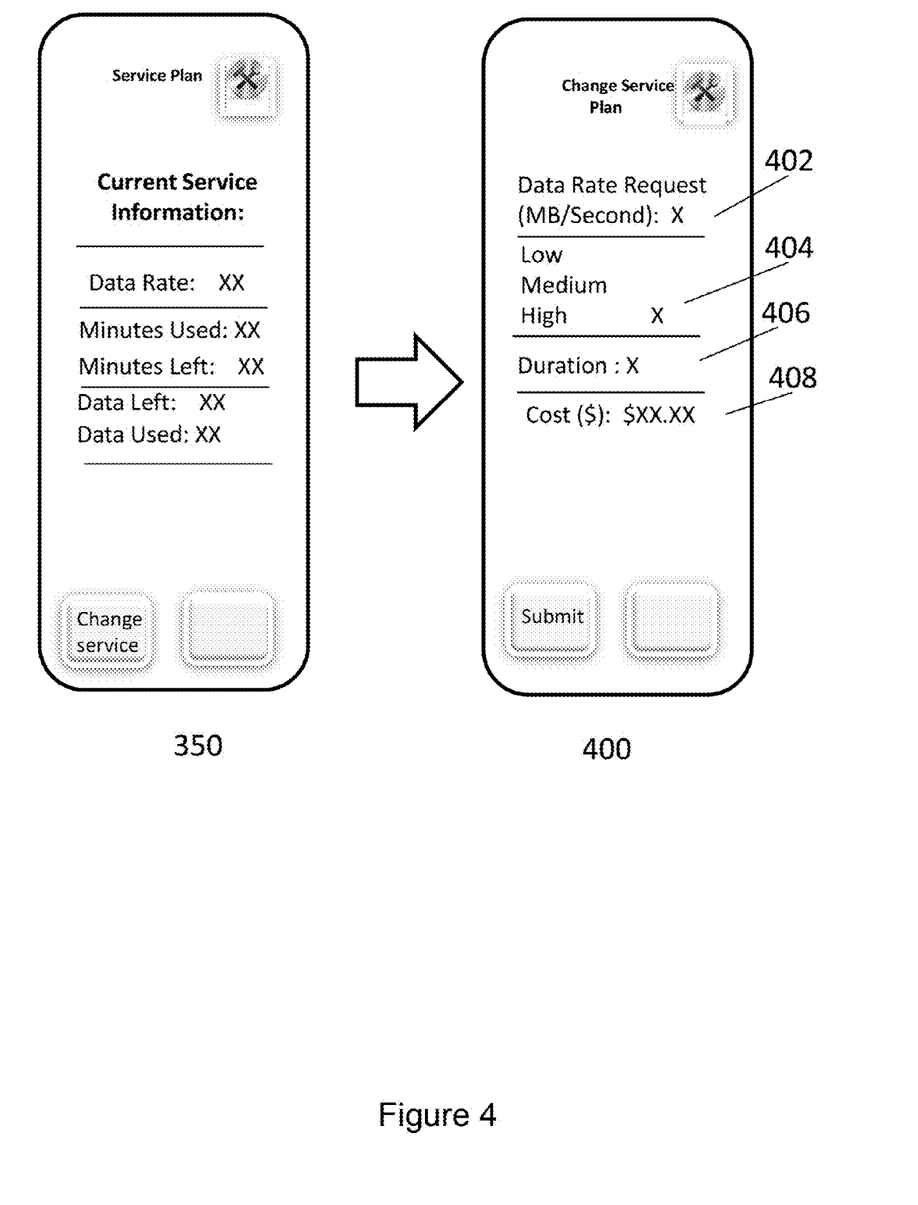
FIG. 4 illustrates other exemplary electronic device displays providing data service options for the electronic device services in accordance with an aspect of the invention.

In an exemplary aspect, the user is permitted to select and change services on the electronic device 104. FIG. 4 illustrates an exemplary display 400 (similar to 350) allowing for such modification. The application on the electronic device 104 may prompt the user to enter or select information regarding modifying the data service, such as a data rate, quality, cost, length of service, or a combination thereof.

In one or more aspects, the data service application will have different data rate qualities available to choose from when activating or modifying the service for the device. Some of the data rate qualities available for selection may include but are not limited to a low, medium, or high quality data service. For example, if the user 102 of the electronic device 104 wishes to use the electronic device 104 to send and receive text messages, the user 102 may opt to select a low data quality data service rate. Now, if the user during the middle of his or her service wishes to watch an event, such as for example, a football game, requiring high data quality data service, the user 102, may wish to change his data service from the low quality data service rate to a high quality data service rate. The application allows the user to change quality of services contingent upon their present needs.

In one or more aspects, the data service application may allow the user 102 of the electronic device 104 to enter a dollar value 408 for the amount of data service or the quality of data service the user 102 wishes to purchase thereby increasing the data and/or data service rate available on their data service. In one or more aspects the user may select a fixed dollar value, e.g., $5, $10, $20, etc. The fixed dollar values are depleted depending upon the extent of use and the type of data quality employed. That is, the lower the data quality service, the more data that is available to the user. Meanwhile, the higher the data quality service, the less data is available to the user. Once the user enters the dollar value 408 and submits the change 410, the amount of data left will be updated in screen 350.

In one or more aspects, the data service application will allow the user 102 of the electronic device 104 to select the length for which the new service should last. In one aspect, the selected length may be fixed. The length may be selected from a drop-down list 406, i.e., 1 day, 5 days, 20 days, etc. Once the user enters length of time 406 and the quality of service 404 and submits the change 410, the data rate will be updated in screen 350. After the length of time has expired, the data service returns to the prior data service rate.

Alternatively, the selected length may be variable. The latter aspect may be helpful when a live event is broadcast and the finish time is unpredictable in view of for example, over-time in sporting events. For example, in the football game example given above, if the user 102 desires to modify his data service to employ the high data quality service rate for the duration of the football game and any over-time, the user 102 can select single event and the prior data service rate will return after the single event has been completed. The user therefore does not have to wait until the end of the month and unnecessarily spend money on services they will not be using after the football game.

In another exemplary aspect, data quality may be selected from a fixed list 404, e.g., low, medium, high data quality. Once the user enters the quality of service 404 and submits the change 410, the data rate will be updated in screen 350.

Alternatively, the data service quality may be selected from a variable list, e.g., sliding scale of data quality. This approach may be appropriate in circumstances when the user is aware of the specific data service quality they require for a service. By so doing, the user does not have to pay more for what they desire and retains the maximum available number of minutes.

Selecting to modify data service can be done in multiple ways. Selecting may include, but is not limited to, selecting the length 406 of a particular quality data service, selecting a particular quality of service via a pull down menu 404; manually entering the length of time 406 of a particular quality data service, or manually entering a data quality desired 402. The selection can include dragging and clicking one of plural markers depicting different lengths of time which can be increased or decreased.

Figure 5:
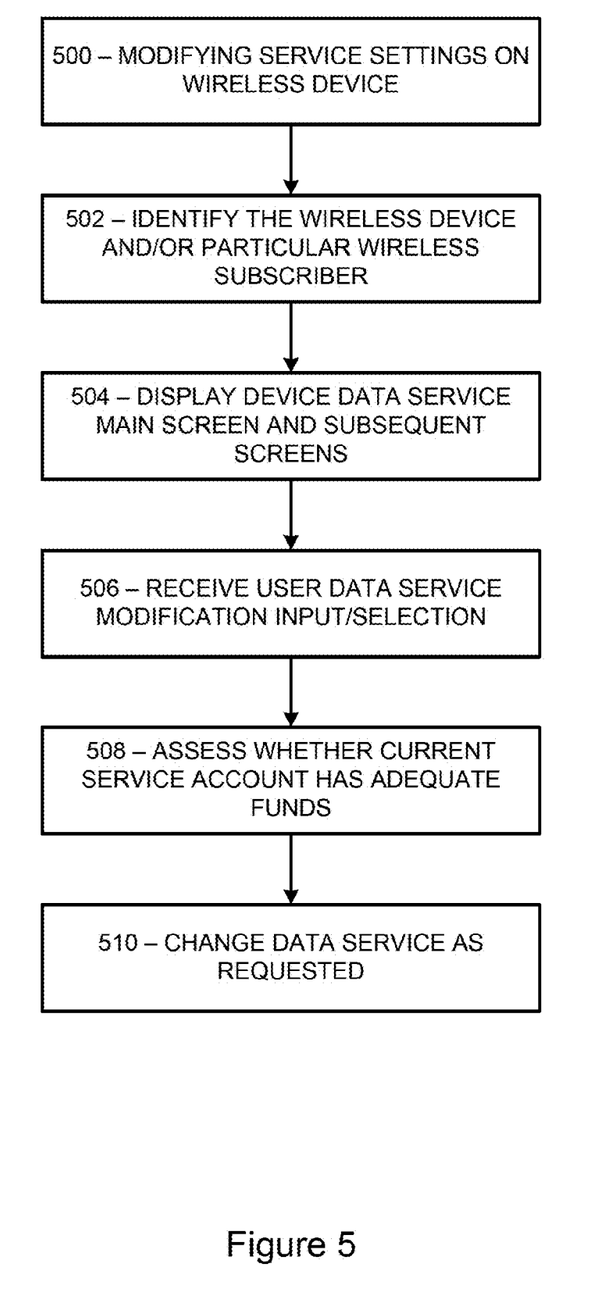
FIG. 5 illustrates an exemplary hierarchy chart showing the application software employed for modifying the data service on the activated electronic device.

As illustrated in FIG. 5, an exemplary hierarchy chart is provided showing application software 500 employed for modifying the data service on an activated electronic device 104. Box 502 illustrates instructions whereby the device data service application identifies the electronic device 104 and the user 102. When the application is launched, the application pulls or updates information about the electronic device 104 and subscriber from the memory. This information may be stored in the memory upon initial activation of the electronic device 104, and may be periodically updated by the electronic device 104 which is configured to send and receive service status requests and messages to and from the wireless network 106 via the channel 105.

Box 504 illustrates instructions whereby the device data service application's main screen and subsequent screens are displayed on a display of the electronic device 104 for user review. The data service application main screen displays service information and allows a user to view, update, add/transfer minutes, end services, or the like. If the user 102 selects the change service link at the bottom of the main screen, a subsequent screen appears prompting the user to enter or select the preferences regarding the desired data service changes the user would like to apply, such as, for example but without limitation, data rate, data rate quality, cost, length of service, or a combination thereof.

Box 506 illustrates receipt of the user's selection regarding the data service they would like to utilize. Again, the user may select to change for example, but without limitation, data rate, data rate quality, cost, length of service, or a combination thereof. And again, making a selection may be done, but is not limited to, a variety of ways: in one aspect the selection may be selected via a pull down menu; in another aspect the user may be prompted to manually enter the selection; in yet another aspect the user may be prompted to make a selection by selecting one of a variety of links depicting the different options.

Box 508 illustrates instructions whereby a determination is made whether the current service plan account has enough funds to enable a change to the desired data service. Once a selection is made and submitted, the application may analyze the selections and compare with the predetermined information pulled from the memory of the electronic device 104 when it launched the application. This information may include, but is not limited to, information regarding how many minutes are left, how many minutes have been used, the current data rate quality, how much time is left at that data rate quality if applicable, credit card or other payment information, and other similar information. After analyzing and comparing, the application may determine if there are enough funds left to implement the new desired service updates.

In a further exemplary aspect, if the application determines that there are not enough funds to proceed with the update, the application may be configured to prompt the user 102 to confirm that their credit card information is stored in memory, to purchase additional funds. The prompt could be, but is not limited to, a text message, a separate pop up window, navigation to a subsequent screen, an email sent to the user's account, a prompt to enter an email address or text to send the update information to, or the like. Alternatively, the application may be capable of authorizing the additional minutes without having to prompt the user depending upon how the user has set up his or her preferences.

Box 510 illustrates instructions whereby the new data service requested by the user is applied. In one or more aspects, the information regarding the update can be sent to the electronic device in one or more ways including but not limited to, a text message, a separate pop up window, navigation to a subsequent screen, an email sent to the user's account, a prompt to enter an email address or text to send the update information to, or the like. In a further exemplary aspect, the prompt could contain a message similar to "Your account has been updated," and then a list of the current service information below that.

Figure 6:
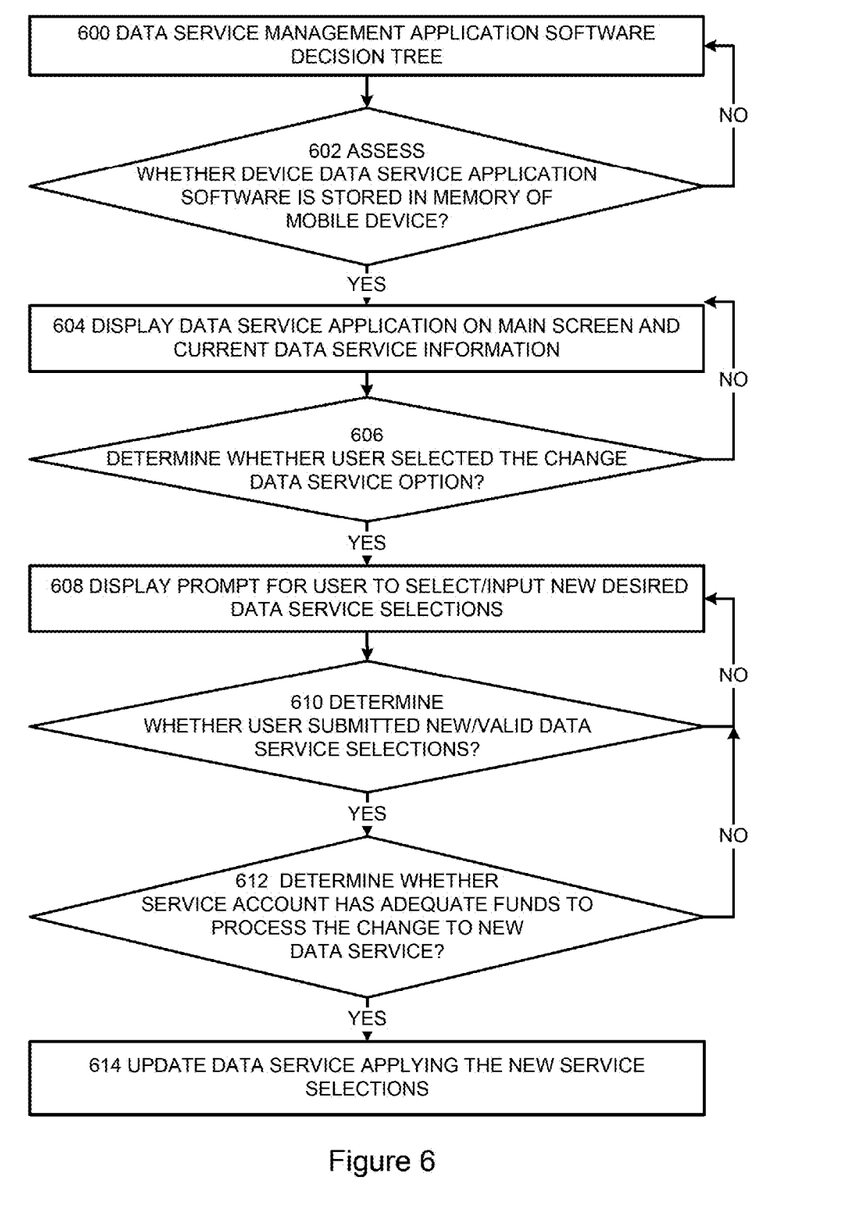
FIG. 6 is a decision tree illustrating the process of the master application.

FIG. 6 illustrates a decision tree 600 for the process of the master application. The first decision box 602 of the process assesses whether the software is located and stored in the memory of the device. According to box 604, if the software program concludes in the affirmative, the data service application along with the subsequent screens is configured to be displayed on the display screen. The initial screen may include a shortcut application for the device management application. Alternatively, the application may be located under the applications tab. In an exemplary aspect, the subsequent screen directly follows the initial screen which displays the device management application.

On the other hand, if the software program concludes in the negative, the process is returned to box 600. At this stage, the application may be required to be installed onto the electronic device 104. In an exemplary aspect, the application is pre-installed on the electronic device 104.

Next, the process queries whether the user has selected to change the data service in box 606. The user accesses the Change Data Service screen by tapping or executing a hyper-linked toggle button towards the bottom of the Data service Home Screen. If the application process concludes in the affirmative, respective fields are displayed prompting the user to select/input new desired data service rates according to box 608. On the other hand, if the process concludes in the negative, the process is returned to box 604. In other words, nothing happens, and the application remains on the same screen/the current data service application home screen. (The flow-process regarding selection of the other possible toggle buttons in the data service application home screen 350, are not depicted in this flow chart.)

A further step of the process, as illustrated by box 610, queries whether the user has submitted new/valid data service rates. If the application process concludes in the affirmative, the process moves to box 612. On the other hand, if the process concludes in the negative, the process is returned to box 608, and the user may be prompted again to select/input a new desired data service selection. Alternatively, if the process concludes in the negative, the application may display a message informing user that the selection was invalid, before returning back to the display stipulated in box 608.

A further step of the process, as illustrated by box 612, queries whether the user has enough funds in that service account to process the change to the new requested data service. If the application process concludes in the affirmative, the data service is updated and the new selections are applied according to box 614. On the other hand, if the process concludes in the negative, the process is returned to box 608, and the user will be prompted again to select/input a new desired data service selection.

Alternatively, if the process concludes in the negative, the application may display a message informing user that the service account does not have adequate funds to complete the data service modification requested, before returning back to the display stipulated in box 608. In yet another alternative aspect, if the process concludes in the negative, the application may display a message informing user that the service account does not have adequate funds to complete the data service modification requested and immediately prompt the user to add more funds to the service plan, before re-processing box 612 again. Regarding adding funds, the user may use credit card, debit card or PayPal information. Alternatively, the user may have a transaction code for wireless services that were purchased from a store or online. This may be the case when the user does not have a credit/debit card or PayPal account, or wishes not provide such information to the application.

Finally, each of the above-noted aspects may transmit the request for the modified data service to one or more of the MNO, MVNO, and an internal accounting module of the electronic device in order to provision and account for the data service. Further details of the internal accounting module are described in U.S. Pat. No. 6,650,887, to McGregor, et al., filed Nov. 18, 2003 and incorporated by reference herein in its entirety and U.S. patent application Ser. No. 13/669,838, filed Nov. 6, 2012 and incorporated by reference herein in its entirety.

In another aspect of the invention described in this application, there is disclosed a system for improving interaction between data service software stored in the memory on an electronic device 104 and MNO/MVNOs for modifying a data service after the mobile device 104 has been activated.

In an exemplary aspect, the memory element of the system may include but is not limited to a memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like.

The code of the data service application is configured to perform the steps of: (i) displaying the application and sub screens on a display of the smartphone device; (ii) determining that a user selected to change their data service; (iii) displaying prompt for the user to select/input new desired data service selections; and (iv) determining whether the selection is valid and/or whether there are enough funds presently on the service account to complete the service modification.

In a further aspect, the system also includes a processor. The processor may be operatively coupled to the memory, e.g., data storage unit. In an exemplary aspect, the processor may execute the data service application stored on the memory. The processor 214 may be a central processing unit configured to execute instructions including instructions related to software programs. The processor may be configured to process call functions, data transfer, and the like and provide other services to the user.

In an exemplary aspect, the processor may be implemented in any type of mobile smartphone that may be operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

In yet another aspect of the invention disclosed in this application is a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein.

The non-transitory computer-readable or processor-readable medium includes instructions stored thereon for a software program. In an exemplary aspect, the code or instruction of the software program is executable by a processor of the SIM or electronic device 104 in machine readable form. The program of instructions may include the steps of: (i) displaying the application and sub screens on a display of the smartphone device; (ii) determining that a user selected to change their data service; (iii) displaying prompt for the user to select/input new desired data service selections; and (iv) determining whether the selection is valid and/or whether there are enough funds presently on the service account to complete the service modification.

In one or more aspects, the actions and/or events of a method, algorithm or module may reside as one or any combination or set of codes and/or instructions on a computer readable medium or machine readable medium, which may be incorporated into a computer program product. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device.

The application may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), 4G-LTE, Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A process for modifying wireless data service provided by a wireless network for a wireless electronic device comprising:
    providing an application for modifying wireless data services that includes a wireless data rate quality provided by the wireless network, the application generating a graphical user interface on a display of the electronic device;
    receiving a request from a user to modify a current wireless data service provided by the wireless network that includes a wireless data rate quality provided by the wireless network with a new wireless data service that includes a new wireless data rate quality provided by the wireless network through an input device;
    evaluating the requested new wireless data service request in view of predetermined information of the user with a processor; and
    updating the wireless data service provided by the wireless network with the new wireless data service after the evaluation with the processor.

2. The process according to claim 1, wherein the request for the new data service further comprises at least one of the following: cost of data service, length of time of data service and combinations thereof.

3. The process according to claim 1, wherein the request for the new data service further includes length of time of the wireless data service.

4. The process according to claim 1, wherein the evaluating includes determining available funds to pay for the new wireless data service.

5. The process according to claim 1, further comprising:
    prompting the user if there are insufficient funds to process the new wireless data service request.

6. The process according to claim 5, further comprising:
    receiving authorization from the user to add funds to implement the new wireless data service.

7. The process according to claim 1, wherein the predetermined information is selected from at least one of the following: remaining wireless data time, remaining wireless talk-time, current wireless data rate quality, remaining wireless service funds, credit/debit information, security profile, user-approved billing authorization requests, and security questions.

8. The process according to claim 1, wherein the electronic device is a pre-paid wireless phone with wireless network services provided by a mobile virtual network operator.

9. A wireless electronic device configured for modifying wireless data service provided by a wireless network comprising:
 a display configured to display an application for modifying wireless data services that includes a wireless data rate quality provided by the wireless network, the application generating a graphical user interface on the display of the electronic device;
 an input device configured to receive a request from a user to modify a current wireless data service provided by the wireless network with a new wireless data service provided by the wireless network that includes a new wireless data rate quality;
 a processor configured to evaluate the requested new wireless data service request in view of predetermined information of the user; and
 a transceiver configured to inform the wireless network to modify the wireless data service with the new wireless data service after the evaluation.

10. The device according to claim 9, wherein the request for the new wireless data service comprises at least one of the following: cost of data service, length of time of data service and combinations thereof.

11. The device according to claim 9, wherein the request for the new wireless data service includes length of time of the wireless data service.

12. The device according to claim 9, wherein the processor is further configured to determine available funds to pay for the new wireless data service.

13. The device according to claim 9, wherein the processor is further configured to prompt the user if there are insufficient funds to process the new wireless data service request.

14. The device according to claim 13, wherein the processor is further configured to receive authorization from the user to add funds to implement the new wireless data service.

15. The device according to claim 9, wherein the predetermined information is selected from at least one of the following remaining wireless data time, remaining wireless talk-time minutes, current wireless data rate quality, remaining funds, credit/debit information, security profile, user-approved billing authorization requests, and security questions.

16. The device according to claim 9 comprises a pre-paid wireless phone with wireless network services provided by a mobile virtual network operator.

17. A non-transitory computer readable storage medium storing computer-readable instructions for a software application for modifying wireless data service provided by a wireless network, which when executed on a processor, causes an electronic device to perform the following steps:
 instructions for displaying an application for modifying wireless data services that includes a wireless data rate quality provided by the wireless network, the instructions generating a graphical user interface on a display of the electronic device;
 instructions for receiving a request from a user to modify a current wireless data service that includes a wireless data rate quality provided by the wireless network with a new data service that includes a new wireless data rate quality provided by the wireless network;
 instructions for evaluating the requested new wireless data service request in view of predetermined information of the user; and
 instructions for updating the wireless data service provided by the wireless network with the new wireless data service after the evaluation.

18. The non-transitory computer readable storage medium according to claim 17, wherein the request for the new wireless data service comprises at least one of the following: cost of data service, length of time of data service and combinations thereof.

19. The non-transitory computer readable storage medium according to claim 17, wherein the request for the new wireless data service includes length of time of the wireless data service.

20. The non-transitory computer readable storage medium according to claim 17, wherein the evaluating includes determining available funds to pay for the new wireless data service.

* * * * *